United States Patent Office 3,274,296
Patented Sept. 20, 1966

3,274,296
GRAFT POLYMERS OF 2,2-DIMETHYL ALKYL ACRYLATE MONOMER ON A POLYMERIC VINYLIDENE CHLORIDE BACKBONE
Hugh J. Hagemeyer, Jr., Alden E. Blood, and Marvin B. Edwards, Longview, Tex., assignors to Eastman Kodak Company, Rochester, N.Y., a corporation of New Jersey
No Drawing. Filed Sept. 12, 1963, Ser. No. 308,377
6 Claims. (Cl. 260—883)

This invention relates to resinous graft copolymers prepared from monomeric 2,2-dimethyl alkyl acrylates and methacrylates and preformed vinylidene chloride copolymers that are particularly useful for the preparation of films and fibers characterized by high strength, high softening points and outstanding stability.

The use of vinylidene chloride in fiber and film-forming compositions is well known. These compositions are characterized by their resistance to burning in most cases. The compositions containing high proportions of vinylidene chloride have high softening temperatures, but they are intractable and difficult to dye. Also, vinylidene chloride polymers have had the tendency of eliminating hydrogen chloride on exposure to heat and light. Blending or grafting other monomers of the usual type with vinylidene chloride has resulted in more readily worked compositions, but invariably difficulty is encountered in low softening points, hydrolytic instability, etc. The best of the heretofore known vinylidene chloride compositions have lower softening points than is desirable for many commercial applications, and in many cases the comonomer introduces hydrolytic instability. Accordingly, such vinylidene chloride compositions have had but limited utility.

We have now found that vinylidene chloride graft copolymers of improved thermal and hydrolytic stability are obtained by graft copolymerizing monomeric 2,2-dimethyl alkyl acrylates or methacrylates onto a preformed vinylidene chloride copolymer, in certain specified proportions, and that they are readily processed to shaped articles and are especially suitable for the preparation of films and fibers that are characterized by good flexibility and strength, excellent affinity for dyes, relatively high softening points and improved thermal and hydrolytic stability.

It is an object of the invention, therefore, to provide a new class of improved stability, resinous vinylidene chloride graft copolymers. Another object is to provide superior films and fibers and other shaped articles from these graft copolymers. Another object is to provide a method for preparing the above new materials. Other objects will become apparent from the description and examples.

In accordance with the invention, the new class of resinous vinylidene chloride graft copolymers are prepared by copolymerizing a mixture of (1) from 5–55% by weight, and preferably from 15–45% of a monomeric 2,2-dimethylalkyl acrylate or methacrylate represented by the general formula:

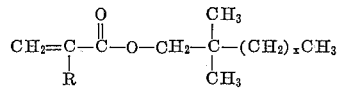

wherein $x$ represents an integer of from 1–11 and R represents hydrogen or methyl group, e.g. 2,2-dimethylbutyl acrylate, 2,2-dimethylpentyl acrylate, 2,2-dimethylhexyl acrylate, 2,2-dimethylheptyl acrylate, 2,2-dimethyloctyl acrylate, 2,2-dimethyldecyl acrylate, 2,2-dimethyldodecyl acrylate, 2,2-dimethyltetradecyl acrylate, etc. and the corresponding methacrylates, and (2) from 95–45% by weight and preferably from 85–55% of a preformed copolymer of at least 80% by weight, and preferably from 80–95%, of vinylidene chloride and not more than 20% by weight of one or more other monoethylenically unsaturated, polymerizable compounds, i.e. comonomers, containing a —CH=C< group, or more especially a $CH_2=C<$ group, until the monomeric 2,2-dimethylalkyl acrylate or methacrylate has combined with the preformed copolymers to form the said resinous graft copolymer of the invention.

Suitable monoethylenically unsaturated comonomers include vinyl and isopropenyl carboxylic esters such as vinyl acetate, isopropenyl acetate, vinyl propionate, vinyl butyrate, vinyl benzoate, vinyl trifluoroacetate, vinyl 2,2-dimethylbutyrate, vinyl 2,2-dimethylhexanoate, vinyl 2,2-dimethyldodecanoate, etc., alkyl esters of acrylic and methacrylic acids such as methyl acrylate, ethyl acrylate, butyl acrylate, methyl methacrylate, 2,2-dimethylalkyl acrylates and methacrylates such as included in the above general formula, etc., unsaturated nitriles such as acrylonitrile, methacrylonitrile, ethacrylonitrile, etc., vinyl hydrocarbons such as styrene, α-methylstyrene, ethylene, isobutylene, etc., vinyl chloride, vinylidene cyanide, vinyl fluoride, etc., acrylamide, methacrylamide, N-alkyl acrylamides and methacrylamides, such as N-2,2-dimethylalkyl acrylamides such as N-2,2-dimethylbutyl acrylamide, N-2,2-dimethylbutyl methacrylamide, N-2,2-dimethyldecyl acrylamide, etc., di-N-2,2-dimethylalkyl fumaramides, maleamides, etc., dialkyl maleates, fumarates, itaconates, citraconates, etc., allyl esters such as allyl acetate, methallyl acetate, vinyl alkyl ethers, e.g. vinyl methyl ether, etc., vinyl alkyl ketones, vinyl sulfonamides, vinyl urethanes, vinyl pyrrolidones, e.g. N-vinyl pyrrolidone, etc., vinyl pyridines, and the like. Particularly unique products are obtained where the comonomer contains a 2,2-dimethylalkyl group of from 6–14 carbon atoms. For example, copolymers prepared from vinylidene chloride and N-2,2-dimethylbutyl acrylamide or 2,2-dimethylbutyl methacrylate.

The graft copolymerization of the invention can be carried out by any of the well-known polymerization techniques. The reactions are accelerated by heat, by actinic light such as ultraviolet light and by the use of known polymerization catalysts such as the peroxides, e.g. benzoyl peroxide, acetyl peroxide, lauryl peroxide, triacetone peroxide, urea peroxide, t-butyl hydroperoxide, alkyl percarbonates, etc., hydrogen peroxide, alkali metal persulfates, e.g., sodium or potassium persulfates, ammonium persulfate, alkali metal perborates, and the like. Other useful polymerization catalysts are boron trifluoride and azo-bis-nitriles. Mixtures of catalysts can be employed. The quantity of catalyst employed can be varied depending on the reaction medium and other conditions, but ordinarily from about 0.01 to 2% or more, based on the weight of materials to be polymerized, is efficacious.

Advantageously, the polymerizations are carried out under an inert atmosphere, e.g. nitrogen gas, as dispersions in aqueous medium, although in mass polymerizations are also operable. Other reaction media such as organic solvents can be used. For example, hydrocarbons such as benzene, n-heptane, petroleum ether, etc., oxygenated solvents such as acetone, methanol, ethanol, isopropanol, etc., and aqueous solutions of the water-soluble solvents can be used. The term "dispersion" is intended herein to include both true solutions and emulsions. While the ingredients can be mixed in any order ordinarily the preformed copolymer in the form of an aqueous latex is added into and stirred with the 2,2-dimethylalkyl acrylate or methacrylate containing the polymerization catalyst. Suitable emulsifying agents include salts of higher fatty acids, e.g. sodium or potassium stearate, palmitate, etc., sodium or potassium higher fatty alcohol sulfates, e.g. sodium or potassium lauryl sulfate, sodium or potassium stearyl sulfate, etc., salts of aromatic sulfonic acids such as alkylnaphthalene sulfonic acids, and the like.

The temperature of polymerization can be varied widely, for example, from about 30–100° C. or more, but preferably from 35–70° C. Atmospheric pressures are preferred, although the process is also operable at pressures substantially above or below normal atmospheric pressures. A continuous polymerization technique can be employed wherein the ingredients are added continuously at a uniform rate and the graft copolymer product is withdrawn as formed from the system in a continuous manner. Advantageously, an activating agent such as an alkali metal bisulfite or metabisulfite, e.g. sodium or potassium bisulfite, can be used in conjunction with the catalyst in approximately equal amount. Chain regulators such as hexyl, octyl; t-dodecyl mercaptans, etc. which impart improved solubility to the resulting graft copolymers can be added.

Stirring, shaking or tumbling of the polymerization reaction mixtures facilitate the polymerizations and produce more uniform products. These can be separated by conventional methods of polymer separation from their reaction mixtures, for example, by addition of saturated salt solutions, such as aqueous saturated lithium chloride or sodium chloride solutions, followed by filtering the precipitated graft copolymer, washing etc. The compositions of the resulting graft copolymers have been found to be approximately of the same proportions of substituents as were present in the starting polymerization mixtures.

The 2,2-dimethylalkyl acrylates and methacrylates of the invention can be prepared, for example, by the alcoholysis process comprising an atmospheric reaction between methyl acrylate or methyl methacrylate and the appropriate 2,2-dimethylalkyl alcohols, employing tetraisopropyl titanate as a catalyst. The low boiling by-product methanol is removed in azeotrope form through a fractionating column. The base material is then flashed through a short head and distilled to recover the desired ester product. Although methyl acrylate and methyl methacrylate are the preferred intermediates, it will be understood that any other lower alkyl acrylate or methacrlate can also be used efficaciously in the process, for example, ethyl, propyl, isopropyl, butyl, etc. acrylates and methacrylates. For further details, reference may be had to the descriptions in our copending applications Serial No. 308,374 and Serial No. 308,377, filed of even date herewith. The corresponding maleates, fumarates, itaconates and citraconates comonomers can be prepared by the above general process by alcoholysis of the dimethylmaleates, fumarates, itaconates and citraconates.

The vinyl 2,2-dimethylalkanoate comonomers can be prepared by the addition of acetylene to the appropriate 2,2-dimethylalkanoic acid in the presence of a catalyst such as mercuric sulfate or mercuric phosphate, at elevated temperatures and pressures. The ester products can be isolated by extraction and distillation under reduced pressure.

The N-2,2-dimethylalkyl acrylamides and methacrylamides comonomers can be prepared by the reaction of methyl acrylate or methyl methacrylate with the appropriate 2,2-dimethylalkylamines, by the general process described in Erickson, United States Patent No. 2,451,436, dated October 12, 1948. Reference can be had to copending application of Hagemeyer, Blood and Heller, Serial No. 308,339, filed of even date herewith, for a more detailed description of the preparation of the N-2,2-dimethylalkyl acrylamides and methacrylamides, and corresponding di-N-2,2-dimethylalkyl maleamides, fumaramides, itaconamides and citraconamides.

The following examples illustrate further the manner whereby we practice our invention.

*Example 1*

A mixture of 85 g. of vinylidene chloride, 15 g. N-2,2-dimethylbutyl methacrylamide, 350 ml. water, 0.4 g. sodium persulfate, 1.5-g. Dupanol ME (a fatty alcohol sulfate), and 0.4 g. dodecyl mercaptan was heated at 60° C. under nitrogen for 30 hours. To the resulting latex were added 40 g. 2,2-dimethylhexyl acrylate and 0.3 g. sodium persulfate and the mixture heated under nitrogen at 85° C. for 20 hours. The polymer was precipitated with saturated sodium chloride solutions, washed, and dried. Fibers spun from the polymer had a tenacity of 5.2 grams per denier and an elongation of 36 percent. The fiber was readily dyed to give fast color. The softening point was 220° C. The fibers showed good stability in boiling water and in dilute aqueous alkaline solutions.

*Example 2*

The experiment in Example 1 was repeated except that the N-2,2-dimethylbutyl methacrylamide was replaced with vinyl 2,2-dimethylbutyrate and the 2,2-dimethylhexyl acryate was replaced with 2,2-dimethylbutyl methacrylate. The polymer made good fibers and film. The fiber tenacity was 4.8 grams per denier and the elongation was 28 percent. The softening point was 200° C. The fibers and films showed excellent hydrolytic stability.

*Example 3*

The experiment in Example 1 was repeated except that the N-2,2-dimethylbutyl methacrylamide was replaced with vinyl chloride and the 2,2-dimethylhexyl acrylate was replaced with 2,2-dimethylbutyl acrylate. The polymer made good fiber and film as before. Softening point was 226° C. Tenacity was 5.6 grams per denier and the elongation was 25 percent. The fibers and films exhibited no degradation on testing in hot aqueous solutions.

*Example 4*

The experiment in Example 1 was repeated except that the N-2,2-dimethylbutyl methacrylamide was replaced with acrylonitrile. The fibers had a tenacity of 5.1 grams per denier, an elongation of 35 percent and a softening point of 235° C. They had good hydrolytic stability.

By following the procedures in the above examples, other graft copolymers of the invention having generally similar good physical properties and improved thermal and hydrolytic stability can be readily prepared. For example, the preformed vinylidene chloride copolymer can be prepared with any other of the mentioned monoethylenically unsaturated, polymerizable comonomers such as methacrylonitrile, methyl acrylate, butyl acrylate, methyl methacrylate, dimethyl maleate, vinyl methyl ether, N-vinyl pyrrolidone, ethylene, and the like, and the graft copolymers produced therewith in accordance with the invention likewise have similarly good characteristics.

All of the resinous graft copolymers of the invention can be readily milled, with or without added fillers, pigments, dyes, plasticizers, flow improvers, etc., and most can be blended with other plastic materials compatible therewith such as vinyl chloride polymers, vinylidene chloride polymers, alkyl acrylate and methacrylate polymers, and the like, and converted to various shaped articles of improved chemical and thermal stability such as sheets, films, etc., that are flexible and tough, and useful as wrapping materials, photographic film supports, etc., by the usual compression, extrusion or injection molding techniques or by melt-spinning methods to fibers having improved stability and physical properties. The graft copolymers can also be dissolved in certain solvents such as methylethyl ketone, cyclohexanone, ethylene carbonate, N,N-dimethylformamide, N,N-dimethylacetamide, dimethyl sulfone, and the like, with or without the above mentioned additives, and the resulting solutions or dopes then converted into similar improved sheets, films, fibers, etc. by conventional coating and spinning methods.

The invention has been described in detail with particular reference to preferred embodiments thereof, but it will be understood that variations and modifications can be effected within the spirit and scope of the invention as described hereinabove and as defined in the appended claims.

What we claim is:

1. A resinous graft copolymer of (1) from 5–55% by weight of a monomeric compound having the general formula:

$$CH_2=C-\underset{R}{\overset{\overset{O}{\|}}{C}}-O-CH_2-\underset{CH_3}{\overset{CH_3}{\underset{|}{C}}}-(CH_2)_xCH_3$$

wherein $x$ represents an integer of from 1–11 and R represents a member selected from the group consisting of a hydrogen atom and a methyl group, and (2) from 95–45% by weight of a preformed copolymer consisting of at least 80% by weight of vinylidene chloride and not more than 20% by weight of at least one monoethylenically unsaturated compound containing a :—CH=C< group.

$$-CH=C\diagdown$$

2. A resinous graft copolymer of (1) from 15–45% by weight of a 2,2-dimethyl hexyl acrylate, and (2) from 85–55% by weight of a preformed copolymer consisting of not more than 80% by weight of vinylidene chloride and not more than 20% by weight of N-2,2-dimethylbutyl methacrylamide.

3. A resinous graft copolymer of (1) from 15–45% by weight of 2,2-dimethylbutyl methacrylate, and (2) from 85–55% by weight of a preformed copolymer consisting of not less than 80% by weight of vinylidene chloride and not more than 20% by weight of vinyl 2,2-dimethylbutyrate.

4. A resinous graft copolymer of (1) from 15–45% by weight of 2,2-dimethylbutyl acrylate, and (2) from 85–55% by weight of a preformed copolymer consisting of not more than 80% by weight of vinylidene chloride and not more than 20% by weight of vinyl chloride.

5. A resinous graft copolymer of (1) from 15–45% by weight of 2,2-dimethylhexyl acrylate, and (2) from 85–15% by weight of a preformed copolymer consisting of not less than 80% by weight of vinylidene chloride and not more than 20% by weight of acrylonitrile.

6. A process for preparing a resinous graft copolymer which comprises heating in the presence of a polymerization catalyst an aqueous dispersion comprising (1) from 5–55% by weight of a monomeric compound having the general formula:

$$CH_2=C-\underset{R}{\overset{\overset{O}{\|}}{C}}-O-CH_2-\underset{CH_3}{\overset{CH_3}{\underset{|}{C}}}-(CH_2)_xCH_3$$

wherein $x$ represents an integer of from 1–11 and R represents a member selected from the group consisting of a hydrogen atom and a methyl group, and (2) from 95–45% by weight of a preformed copolymer consisting of at least 80% by weight of vinylidene chloride and not more than 20% by weight of at least one monoethylenically unsaturated compound containing a —CH=C< group, until the said monomeric compound has combined with the said copolymer to form the said graft copolymer.

References Cited by the Examiner

UNITED STATES PATENTS

| | | | |
|---|---|---|---|
| 2,849,419 | 8/1958 | Hayes et al. | 260—884 |
| 2,889,354 | 6/1959 | Blake et al. | 260—617 |
| 3,004,957 | 10/1961 | Lynn | 260—86.3 |

MURRAY TILLMAN, *Primary Examiner.*

J. T. GOOLKASIAN, *Assistant Examiner.*